United States Patent [19]

Hall

[11] Patent Number: 4,626,346
[45] Date of Patent: Dec. 2, 1986

[54] REVERSE OSMOSIS WATER PURIFICATION SYSTEM FOR USE IN LIMITED WATER SUPPLY INSTALLATIONS

[76] Inventor: Belton E. Hall, 819 College Ave., Tempe, Ariz. 85282

[21] Appl. No.: 827,867

[22] Filed: Feb. 10, 1986

[51] Int. Cl.$^4$ .............................................. B01D 13/00
[52] U.S. Cl. ................... 210/110; 210/137; 210/257.2
[58] Field of Search ................ 210/97, 110, 116, 137, 210/257.2, 433.2

[56] References Cited

U.S. PATENT DOCUMENTS

| | | | |
|---|---|---|---|
| 3,405,058 | 10/1968 | Miller | 210/137 |
| 3,543,294 | 11/1970 | Boester | 210/116 |
| 4,021,343 | 5/1977 | Tyler | 210/257.2 |
| 4,190,537 | 2/1980 | Tondreau et al. | 210/110 |
| 4,554,009 | 11/1985 | Aid et al. | 210/137 |

Primary Examiner—John Adee
Attorney, Agent, or Firm—Herbert E. Haynes, Jr.

[57] ABSTRACT

A reverse osmosis water purification system for purification of water received from a supply tank having a limited and exhaustible supply of water. Water is extracted from the supply tank by a pump which directs the extracted water under pressure to a reverse osmosis unit which in turn directs the purified water to a hydro-pneumatic storage tank with the waste water produced by the reverse osmosis unit being returned to the supply tank for water conservation purposes. The system further includes a pressure sensing switch associated with the hydro-pneumatic storage tank and the pump to maintain the differential pressure across the reverse osmosis unit in a predetermined pressure range.

13 Claims, 3 Drawing Figures

REVERSE OSMOSIS WATER PURIFICATION SYSTEM FOR USE IN LIMITED WATER SUPPLY INSTALLATIONS

BACKGROUND OF THE INVENTION

1. Field of the Invention

This invention relates generally to water purification mechanisms and more particularly to a reverse osmosis water purification system for use in limited water supply installations.

2. Description of the Prior Art

The purification of water by reverse osmosis is an old and well known technology which is being used considerably more today than it was in the past due to increasing drinking water problems resulting from pollution, and the like. The increasing usage of this old technology has resulted in the development and refinement of systems which are economically and technically feasible for use in domestic and similar applications.

Water purification by reverse osmosis, as is well known in the art, takes time and therefore is unsuited for use on a direct as needed, or demand basis. In other words, in order for a water purification reverse osmosis apparatus to be practical, the apparatus will operate until a predetermined quantity of pure water is produced and that water is stored for use when a demand occurs. When a demand occurs, the reverse osmosis apparatus will resume operation to replace the amount depleted from the stored supply by the demand.

A particular prior art reverse osmosis water purification and storage apparatus currently being used employs a special diaphragm-type hydro-pneumatic storage tank into which the purified water from a reverse osmosis unit is stored. The special tank is provided with a diaphragm to divide it into a water storage compartment and a pre-pressurized air compartment. Pure water from the reverse osmosis unit is directed into the water storage compartment and, by diaphragm action, will compress the air in the pre-pressurized air compartment. When a demand for pure water occurs, the compressed air in the air compartment will exert a force in the diaphragm causing the water in the storage compartment of the tank to flow under the influence of that force through the plumbing line to the open fixture, usually a faucet.

In order for a reverse osmosis unit to function properly, there must be a differential pressure across the reverse osmosis membrane. In view of this requirement, it is essential that the water pressure in the water storage compartment of the special tank of the above described prior art apparatus not be allowed to approach input line pressure. If this is allowed to occur, the differential pressure across the reverse osmosis membrane will fall below a minimum value and the pure water production rate of the reverse osmosis unit as well as the purity of the water will fall below acceptable levels.

When water is being purified by reverse osmosis, it will, in addition to producing highly purified water, produce a considerable amount of waste water as is well known in the art. This production of waste water has kept the use of the reverse osmosis water purification technology from being used whenever the supply of water to be purified is limited for whatever reason.

For example, in self contained motor homes, recreational vehicles, boats and the like, it is a common practice to carry water in a supply tank on board the vehicle. Water from a known source of potable water is placed in the supply tank and is used for multiple purposes such as flushing toilets, washing dishes, bathing, and of course, drinking and cooking. In that potable water is not always available at all locations where the above mentioned types of vehicles may travel or be used, the water in the supply tank is used very carefully and conserved whenever possible. Due to this, reverse osmosis water purification systems have heretofore not been used in limited water supply situations because of the inherent production of waste water in such systems.

Therefore, a need exists for a new and useful reverse osmosis water purification system for use in limited water supply installations.

SUMMARY OF THE INVENTION

In accordance with the present invention, a new and useful reverse osmosis water purification system is disclosed as including a pump means for extracting water to be purified from a supply tank and directing the extracted water at a predetermined pressure to a reverse osmosis unit. Purified water emerging from the reverse osmosis unit is directed to a hydro-pneumatic tank having a diaphragm therein for dividing the tank into a pure water storage compartment and a pre-pressurized air compartment. Pure water from the reverse osmosis unit is directed into the water storage compartment of the hydro-pneumatic tank for use whenever a demand is made for that water. Water entering the storage compartment of the tank will, in the absence of a demand, cause a build-up in the water pressure therein which, by diaphragm action causes compression of the air in the air compartment of the tank. When a demand is made for the stored pure water, such as by opening of a faucet, or any other demand operated dispensing device, the water pressure in the storage compartment will fall allowing the higher pressure in the air compartment to move the diaphragm and thereby cause the stored water to move through the outlet filter into the plumbing line leading to the open faucet.

As hereinbefore described, the water pressure in the water storage compartment of the hydro-pneumatic tank, which is felt on one side of the reverse osmosis membrane, must not be allowed to increase to a value which approaches the outlet water pressure from the pump which is felt on the opposite side of the reverse osmosis membrane. If the differential pressure across the reverse osmosis membrane is allowed to fall below a minimum value, the performance of the reverse osmosis unit will suffer.

Whenever purified water is directed into the water storage compartment of the tank, water pressure in the storage compartment will increase. As long as the water pressure in the water storage compartment is kept below a predetermined amount, the pressure build-up across the reverse osmosis unit will be limited to within an acceptable limit.

Therefore, the system of the present invention includes a pressure sensing switch means which is used to control operation of the pump means. The pressure sensing switch means is coupled so as to sense the pressure in the water storage compartment of the hydro-pneumatic tank and turn the pump off whenever the sensed pressure exceeds a predetermined value.

In order to conserve water in the above discussed limited supply situations, the waste water produced by the reverse osmosis unit is directed back into the water supply tank as opposed to the customary practice of disposing of such water. As a result of this, the reverse osmosis water purification system of the present invention will not waste any water. The hydro-pneumatic tank will, when operational, contain a supply of purified water for drinking and cooking purposes with that supply being adequate for normal usages. The water in the limited capacity supply tank, which contains increasing amounts of the waste water directed thereto by the reverse osmosis system, will remain suitable for non-drinking uses such as flushing toilets, bathing, washing dishes and the like. And, since all water extracted from the supply tank for treatment in the reverse osmosis system will be purified anyway, the water in the supply tank will remain suitable for all use requirements.

An additional benefit results from using the water purification system of the present invention in the hereinbefore discussed limited water supply situations. In the event that the supply tank should become depleted and a source of potable water is not available, unpotable water can be used to refill the supply tank in that any water to be consumed will be purified by the reverse osmosis system of the present invention.

Accordingly, it is an object of the present invention to provide a new and useful reverse osmosis water purification system for use in installations having a limited and exhaustible water supply.

Another object of the present invention is to provide a new and useful reverse osmosis water purification system for use in installations having its water supply contained in a supply tank, such as a motor homes recreational vehicles, boats and the like, wherein the water supply is limited and exhaustible.

Another object of the present invention is to provide a new and useful reverse osmosis water purification system of the above described character wherein water from the supply tank is directed under pressure by a pump means to the inlet side of the reverse osmosis unit which directs purified water to a hydro-pneumatic storage tank and directs waste water from the reverse osmosis unit back into the water supply tank.

Another object of the present invention is to provide a new and improved reverse osmosis water purification and storage system of the above described character wherein water under pressure is supplied from the storage tank to the reverse osmosis unit by the pump means with the resulting purified water being stored for demand use in the water compartment of a hydro-pneumatic tank and the system is provided with a pressure sensing switch means for positively preventing the water pressure build-up in the water storage tank from exceeding a predetermined value so that the differential pressure across the reverse osmosis unit will not fall below the value required for proper operation of the reverse osmosis unit.

The foregoing and other objects of the present invention as well as the invention itself may be more fully understood from the following description when read in conjunction with the accompanying drawings.

DESCRIPTION OF THE PREFERRED EMBODIMENT

Figure 1:
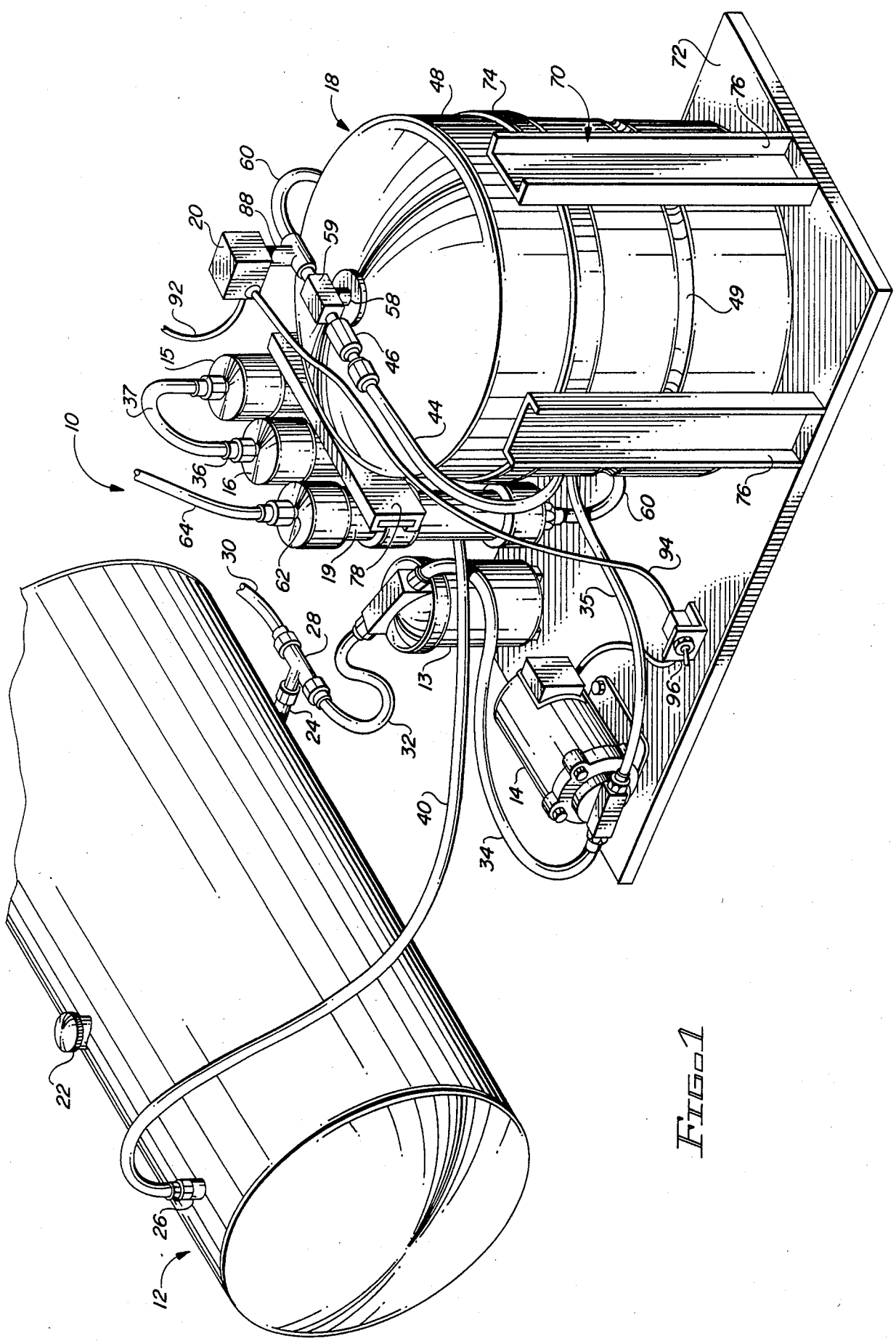
FIG. 1 is a perspective view of the reverse osmosis water purification system of the present invention.

Referring more particularly to the drawings, FIG. 1 shows the reverse osmosis water purification system of the present invention which is indicated in its entirety by the reference numeral 10.

As will hereinafter be described in detail, the main components and sub-assemblies of the system 10 are a water supply tank 12, a preliminary inlet filter 13 a pump means 14, a secondary inlet filter 15, a reverse osmosis unit 16, a hydro-pneumatic storage tank 18, an outlet filter 19 and a pressure sensing switch means 20.

The water supply tank 12 may be any suitable tank of the type used to receive and store water for subsequent use, with it being understood that the tank 12 is for containment of an exhaustible supply of water. In other words, the supply tank 12 is not permanently connected to a source of water, such as a municipal water supply line, but is instead filled from time to time whenever a suitable source of water is available.

It will be seen from the following description that the reverse osmosis water purification system 10 of this invention may be used whenever highly purified water is to be produced from an exhaustible water supply. The primary intended usage of the system 10 is in motor homes, recreational vehicles, boats and the like, wherein the exhaustible water supply is contained within a relatively small supply tank, such as one having a capacity of about 80 gallons. For convenience of the following description, the system 10 will hereinafter be described for use in the above mentioned vehicular environment, with it being understood that the invention is not to be limited to that particular type of installation.

The water supply storage tank 12 includes a suitable fill port 22, an outlet port 24 and is modified for use in the system of this invention to have a return port 26 for reasons which will hereinafter be described in detail. The outlet port 24 is provided with a divider means 28, such as the illustrated tee, to provide means for connecting first and second plumbing supply pipe lines 30 and 32 thereto. The first plumbing supply pipeline 30 is provided to supply water whenever needed, for nonpotable water usage, such as flushing toilets, washing dishes, bathing, and the like in the vehicle (not shown) in which the system 10 is to be installed. The second plumbing supply pipeline 32 is connected to the inlet port of the preliminary inlet filter 13. The preliminary inlet filter 13 is intended for removal of relatively large foreign particles, such as sand and the like, and may be provided with any of various well known filtering media such as charcoal (not shown), a wire mesh screen (not shown) or the like.

Filtered water is coupled from the outlet port of the preliminary inlet filter 13 by a plumbing pipeline 34 to the inlet of the pump means 14. The pump means 14 is an electrically operated device having a given output rate and output pressure. As will hereinafter be described in detail, reverse osmosis water purification systems will process water in relatively low volumes and for proper operation, a predetermined differential pressure should be maintained across the reverse osmosis unit. Therefore, the pump means 14 should deliver relatively low volumes of water at a predetermined pressure. It has been found that if the pump means 14 delivers approximately 5-6 gallons of water per hour at about 90 PSI, it will operate well in the system 10 of the present invention.

The pump means 14 extracts water to be purified from the supply tank 12 and draws it through the preliminary filter 13 and delivers it in the above suggested volume and pressure to the secondary inlet filter 15 by means of a suitable pipeline 35. The secondary inlet filter 15 is intended to remove foreign particles from the water that were missed by the preliminary inlet filter 13. Therefore, the secondary inlet filter 15 is provided with a finer filtering media (not shown) of any well known type.

Filtered water from the secondary inlet filter 15 is supplied to the inlet port 36 of the reverse osmosis unit 16 by means of a plumbing line 37. As is well known in the art, the reverse osmosis unit 16 contains a membrane (not shown) which purifies water by the reverse osmosis process and has waste water as a by-product. The unit 16 is provided with a waste water outlet port 38 having a tube 40 by which the waste water is carried away from the unit 16 as will hereinafter be described in detail. The reverse osmosis unit 16 also has a pure water outlet port 42 having a plumbing line 44 coupled thereto through which purified water is supplied through a one-way check valve 46 to the hydro-pneumatic storage tank 18.

Figure 2:
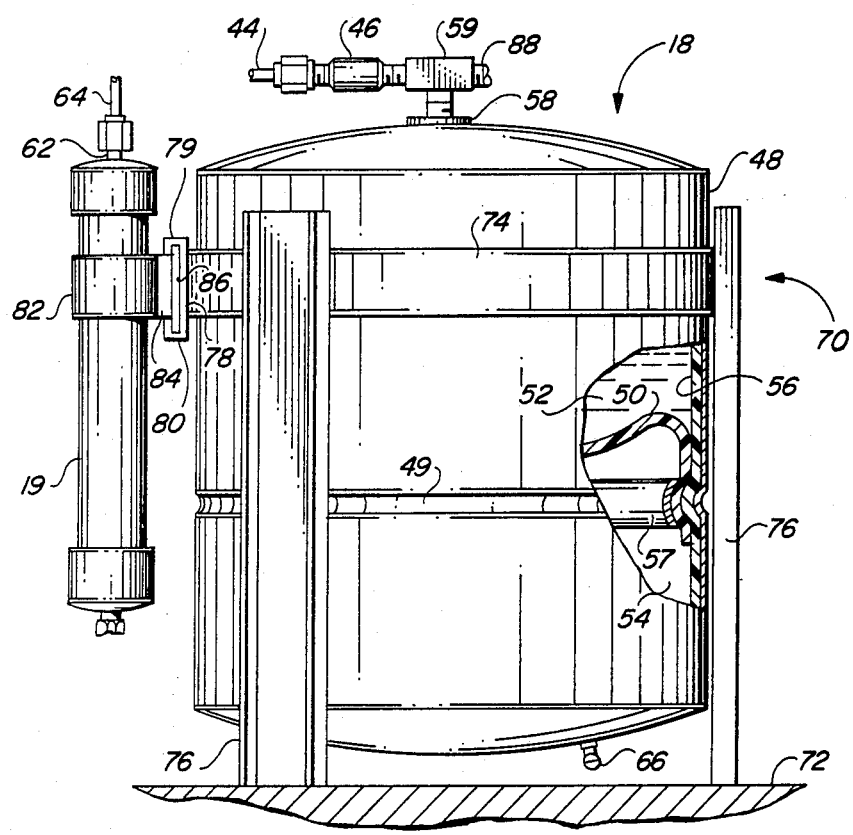
FIG. 2 is a side elevational view of the hydro-pneumatic storage tank component of the system of the present invention with portions thereof being broken away to show the various features thereof.

The hydro-pneumatic storage tank 18 as seen in FIG. 2, includes a tank body 48 which is formed with an annular groove 49 intermediate its top and bottom ends. An elastomeric diaphragm 50 is provided in the body 48 to divide the interior thereof into a water storage compartment 52 and an air compartment 54. The water storage compartment 52 is provided with a liner 56 of inert material, and both the liner 56 and the diaphragm 50 are fixedly attached in a leak-proof manner to the inwardly extending annular ridge provided by the groove 49, by the means of a clamping ring 57. The air compartment 54 is pre-charged at the factory with a predetermined pressure so that the diaphragm 50 will move in accordance with the differential pressure thereacross. When the water storage compartment 52 is empty, pressure in the air compartment 54 will move the diaphragm to the top wall of the tank body 48. When water enters the water storage compartment it will move the diaphragm away from the top wall of the tank body 48 in accordance with the water pressure and this will, or course, compress the air in the air compartment 54 to values higher than the pre-charged value. As will become apparent as this description progresses, the compressed air in the air compartment 54 is the force which moves the purified water out of the system 10 whenever a demand for pure water is made on the system.

Hydro-pneumatic storage tanks of the above briefly described type are commercially available from Amtrol Inc., 1400 Division Road, W. Warwick, R.I., 02893. The tanks are known as Well-X-Trol and come in various sizes. A particular one of those tanks, which is ideal for use in the system 10 whenever a typical motor home or other recreational vehicular application is involved, is known as model No. WX-102 which has a capacity of about 3 gallons, and its air compartment is pre-charged at about 5-6 PSI.

As shown best in FIG. 2, the tank 18 has a water inlet/outlet port 58 in its top end with a suitable tee-fitting 59 being mounted therein. One branch of the tee-fitting 59 is coupled to the above mentioned one-way check valve 46, with the other branch having a suitable plumbing line 60 coupled thereto. The plumbing line 60 is coupled to the outlet filter 19 for final filtering of the water from the storage tank 18. The outlet filter 19, which may be similar in construction to the previously described secondary inlet filter 15, has a discharge port 62 to which a suitable plumbing line 64 is connected for delivery of purified water to a point, or points of use, such as a drinking water faucet, ice maker, or other demand operated dispensing devices (not shown). The hydro-pneumatic storage tank 18 is also provided with a suitable air fitting 66 in its bottom end for pre-charging of the air compartment 54 as hereinafter described.

In order for the reverse osmosis unit 16 to function properly, as hereinbefore mentioned, there must be a differential pressure across the internal reverse osmosis membrane (not shown) of the unit. The water pressure of the inlet water supply, from the pump means 14, is felt on one side of the reverse osmosis membrane, and as purified water is supplied to the water storage compartment 52 of the tank 18, the water pressure within the compartment 52 will build up and that pressure is felt on the opposite side of the reverse osmosis membrane. Therefore, the amount of purified water supplied to the storage compartment 52 of the tank 18 must be limited so as to prevent a water pressure build-up therein beyond a point where the necessary differential is reduced below a minimum requirement.

More specifically, a reverse osmosis unit having an ideal differential pressure of 70 PSI, or more, across its membrane will produce about 1 (one) gallon of pure water per hour. If the differential pressure falls to about 50 PSI, the production rate of the pure water will fall to about ½ gallon per hour or less. Further decreases in differential pressure into the neighborhood of about 30 PSI will cause the pure water production rate to decrease, and still further reduction of the differential pressure will also cause the purity of the produced water to deteriorate.

The hereinbefore mentioned pressure sensing switch means 20 is intended to positively control the operation of the system 10 so that the differential pressure across the reverse osmosis unit 16 will not fall below a predetermined value, as will hereinafter be described in detail.

The system 10 further includes a suitable leg structure means 70 for supporting the hydro-pneumatic storage tank 18 on a suitable support substantially horizontal support surface 72 upon which the tank 18 is placed. The leg structure includes a band 74 which is circumscribingly disposed about the tank body 48. A plurality of legs 76, which in the illustrated embodiment are three in number, depend from the band 74 so as to extend below the bottom of the tank so that when the tank is supported on the support surface, the bottom end of the hydro-pneumatic tank 18 is elevated relative to the support surface.

The circumferential band 74 of the leg structure 70 may also have a bracket member 78 which is welded or otherwise attached thereto and that bracket member 78 is employed for demountable attachment of the secondary inlet filter 15 and outlet filter 19, and the reverse osmosis unit 16 to the tank 18. As shown in FIG. 2, the bracket member 78 is of generally C-shaped cross sectional configuration having cofacing flanges 79 and 80 on the extending ends of the arms thereof. In the side view of FIG. 2, the illustrated mounting of the outlet filter 19 is typical of the mounting of the secondary inlet filter 15 and the reverse osmosis unit 16, and therefore, the following description of the mounting of the outlet filter 19 will be understood to also apply to the mounting of the secondary inlet filter 15 and the reverse osmosis unit 16. A strap 82 is circumferentially disposed about the outlet filter 19 and an arm 84 extends integrally and radially from the strap. A cross plate 86 is fixedly mounted, such as by welding, on the extending end of the arm 84, and the cross plate is slidably received in the opening defined by the bracket member 78 in the manner shown.

Figure 3:
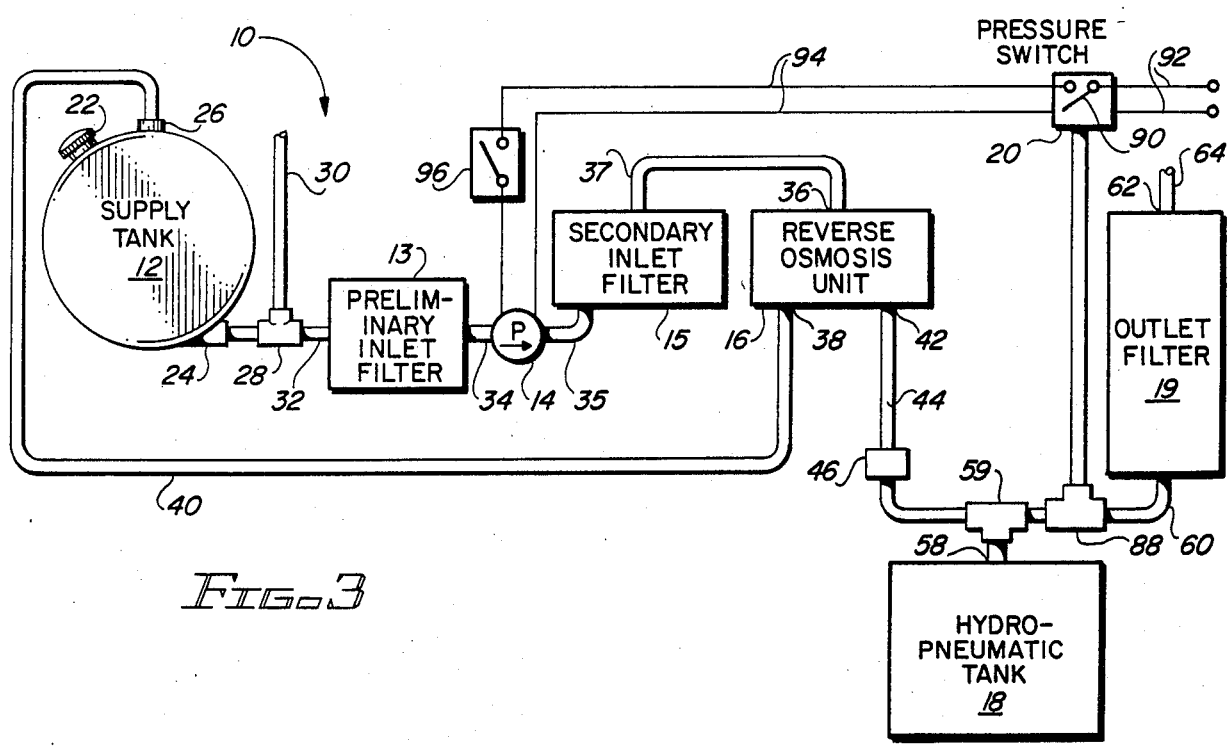
FIG. 3 is a flow diagram illustrating the various components of the system of the present invention and the water flow therethrough.

The hereinbefore mentioned pressure sensing switch means 20 is preferably mounted by an adapter fitting 88 so as to be interposed between the tee-fitting 59 provided on the tank 18 and the plumbing line 60. In this manner, the pressure sensing switch means 20 is coupled to sense the pressure in the water storage compartment 52 of the hydro-pneumatic storage tank 18 and respond to the sensed pressure by opening a normally closed switch 90, shown schematically in FIG. 3, whenever the sensed pressure exceeds a predetermined value. The pressure sensing switch means 20 is connected by conductive wires 92 to a suitable source of electric power such as 12 VDC when the system 10 is utilized in the hereinbefore discussed recreational vehicle environment. Conductive wires 94 are connected between the pressure switch means 20 and the pump means 14 with a suitable on-off switch 96 being provided in the conductive wires 94. Therefore, when the on-off switch 96 is closed and the switch 90 of the pressure switch means 20 is also closed, by virtue of the sensed pressure being below a predetermined value, the system 10 will be operational. And, when the sensed pressure increases to a point above the predetermined value, the switch 90 of pressure switch means 20 will open thereby interrupting operation of the system 10.

In the previously mentioned example wherein the pump means 14 has a maximum output pressure rating of 90 PSI, the pressure sensing switch means 20 may be set to open the switch 90 thereof upon sensing a pressure of approximately 50 PSI and to reset the switch 90 to its closed position when the sensed pressure drops to approximately 30 PSI. Therefore, when the water storage compartment 52 of the hydro-pneumatic storage tank 18 is empty, or nearly so, the differential pressure across the reverse osmosis unit 16 will be approximately 90 PSI and will gradually drop to approximately 40 PSI before the operation of the system 10 is interrupted. In the differential pressure range between 40 and 90 PSI, the reverse osmosis unit 16 will be in the ideal operating condition to produce a maximum quantity of pure water. When the system's operation is interrupted and the pressure in the water storage compartment 52 drops, as a result of pure water usage, to the above mentioned 30 PSI valve, the system 10 will be returned to its operational mode and a pressure differential of 70 PSI will be felt across the reverse osmosis unit 16 at that time. Therefore, in continuous operation, the differential pressure across the reverse osmosis unit will cycle between 40 PSI and 70 PSI.

A particular pressure sensing switch means 20 which has been found as being ideal for this purpose is available from the Square D Corporation, Executive Plaza, Palatine, Ill., 60067, and is identified as 6X536 Series B, Class 9013, type FSG-2, form M1P.

As is well known in the art, the reverse osmosis unit 16 produces waste water in addition to purified water, and the hereinbefore mentioned waste water port 38 having the tube 40 connected thereto are employed to carry the waste water away from the reverse osmosis unit 16. In accordance with the present invention, the waste water tube, or pipeline 40 is coupled between the waste water outlet port 38 of the reverse osmosis unit 16 and the return port 26 of the water supply tank 12. In this way, the waste water produced by the reverse osmosis unit 16 is returned to the supply tank 12 rather than being discarded as is the custom in all prior art reverse osmosis systems known to me.

Therefore, when the reverse osmosis water purification system 10 of the present invention is employed in an environment having a limited and exhaustible water supply, such as in recreational vehicles, motor homes, boats and the like, for which the system 10 is primarily intended, it will not waste any water whatsoever. The water contained in the water supply tank 12 will, of course, become increasingly contaminated during operation of the system 10 but this will not create any problems. The increasing contamination of the water in the supply tank 12 will not hurt the use of that water for non-consumption purposes such as flushing toilets, washing dishes and the like, and all consumable water will be purified by the system of the present invention.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What I claim is:

1. A reverse osmosis water purification system for use with a limited and exhaustible water supply comprising:
   (a) a water supply tank for containment of a limited and exhaustible water supply and having an outlet port and a return port;
   (b) a reverse osmosis unit for producing purified water and having an inlet port, a pure water outlet port and a waste water outlet port;
   (c) pump means coupled between the outlet port of said supply tank and the inlet port of said reverse osmosis unit for extracting water from said supply tank and directing it under pressure to said reverse osmosis unit;
   (d) pipeline means coupled between the waste water outlet port of said reverse osmosis unit and the return port of said supply tank for returning the waste water produced by said reverse osmosis unit to said supply tank;
   (e) a hydro-pneumatic storage tank defining a pure water storage compartment which is coupled to the pure water outlet port of said reverse osmosis unit to receive pure water therefrom; and
   (f) means associated with said storage tank and said pump means for sensing the pressure in the pure water storage compartment of said storage tank and controlling the operation of said pump means to maintain the differential pressure across said reverse osmosis unit in a predetermined pressure range.

2. A reverse osmosis water purification system as claimed in claim 1 wherein said means associated with said storage tank and said pump means is configured to maintain the differential pressure across said reverse osmosis unit in the pressure range of approximately 40 PSI to 90 PSI.

3. A reverse osmosis water purification system as claimed in claim 1 wherein said means associated with said storage tank and said pump means is configured to maintain the differential pressure across said reverse osmosis unit in an initial pressure range of approximately 40 PSI to 90 PSI and a continuously operational pressure range of approximately 40 PSI to 70 PSI.

4. A reverse osmosis water purification system as claimed in claim 1 wherein said means associated with said storage tank and said pump means is a pressure sensing switch means which is coupled to sense the pressure in the pure water storage compartment of said storage tank and operate its switch in accordance with predetermined sensed pressure values.

5. A reverse osmosis water purification system as claimed in claim 4 wherein the switch of said pressure sensing switch means is opened when the sensed pressure reaches approximately 50 PSI and will be reset to its closed state when the sensed pressure drops to approximately 30 PSI.

6. A reverse osmosis water purification system as claimed in claim 5 wherein the switch of said pressure sensing switch means is in the power supply line of said pump means to allow said pump means to operate when the switch is closed and to interrupt operation thereof which the switch is opened.

7. A reverse osmosis water purification system as claimed in claim 1 wherein said means associated with said storage tank and said pump means is a pressure sensing switch means which is coupled to the pure water storage compartment of said storage tank for sensing the pressure therein and includes a switch that is mounted in the power supply lines of said pump means to allow said pump means to operate when the sensed pressure is below a predetermined value and to interrupt operation of said pump means when the sensed pressure is above that predetermined value.

8. A reverse osmosis water purification system as claimed in claim 7 wherein the predetermined value of the sensed pressure is approximately 50 PSI.

9. A reverse osmosis water purification system as claimed in claim 1 and further comprising, inlet filter means coupled between outlet port of said supply tank and the inlet port of said reverse osmosis unit.

10. A reverse osmosis water purification system as claimed in claim 9 wherein said inlet filter means comprises:
 (a) preliminary water filter interposed between the outlet port of said supply tank and said pump means; and
 (b) a secondary water filter interposed between said pump means and the inlet port of said reverse osmosis unit.

11. A reverse osmosis water purification system as claimed in claim 1 wherein said hydro-pneumatic storage tank has an outlet pipeline for delivering purified water from the pure water storage compartment thereof upon occurrence of a demand.

12. A reverse osmosis water purification system as claimed in claim 11 and further comprising an outlet water filter in the outlet pipeline said hydro-pneumatic storage tank.

13. A reverse osmosis water purification system for use with a limited and exhaustible water supply, said system comprising:
 (a) a water supply tank for containment of a limited and exhaustible water supply, said supply tank having an outlet port and a return port;
 (b) a reverse osmosis unit for producing purified water and having an inlet port, a pure water outlet port and a waste water outlet port;
 (c) pump means coupled between the outlet port of said supply tank and the inlet port of said reverse osmosis unit for extracting water to be purified from said supply tank and directing it under pressure to said reverse osmosis unit;
 (d) pipeline means coupled between the waste water outlet port of said reverse osmosis unit and the return port of said supply tank for returning the waste produced by said reverse osmosis unit to said supply tank;
 (e) a hydro-pneumatic storage tank defining a pure water storage compartment which is coupled to the pure water output port of said reverse osmosis unit to receive pure water therefrom; and
 (f) pressure sensing switch means associated with said storage tank for sensing the pressure in the pure water storage compartment thereof, said switch means being in the power supply lines of said pump means to allow operation of said pump means when the sensed pressure is below a predetermined value and interrupt operation of said pump means when the sensed pressure is above the predetermined value.

* * * * *